US006944471B2

(12) United States Patent
Qin et al.

(10) Patent No.: US 6,944,471 B2
(45) Date of Patent: Sep. 13, 2005

(54) PROTECTION METHOD FOR FORWARD POWER SATURATION IN CDMA COMMUNICATION SYSTEM AND ITS POWER CONTROL APPARATUS

(75) Inventors: Yanmin Qin, Shen Zhen (CN); Xiaopin Li, Shen Zhen (CN); Xu Fu, Shen Zhen (CN)

(73) Assignee: Huawei Technologies Co., Ltd., Shen Zhen (CN)

( * ) Notice: Subject to any disclaimer, the term of this patent is extended or adjusted under 35 U.S.C. 154(b) by 501 days.

(21) Appl. No.: 10/252,741

(22) Filed: Sep. 23, 2002

(65) Prior Publication Data

US 2003/0087661 A1 May 8, 2003

Related U.S. Application Data

(63) Continuation of application No. PCT/CN01/00335, filed on Mar. 19, 2001.

(30) Foreign Application Priority Data

Mar. 23, 2000 (CN) ........................................ 00115073 A

(51) Int. Cl.$^7$ ............................................... H04Q 7/20
(52) U.S. Cl. .................... 455/522; 455/453; 455/452.1; 455/13.4; 455/67.11; 455/572; 455/127.1; 455/127.5
(58) Field of Search ................................. 455/522, 453, 455/452.1, 452.2, 9, 13.4, 67.11, 572, 127.1, 127.5

(56) References Cited

U.S. PATENT DOCUMENTS

| | | | |
|---|---|---|---|
| 5,689,815 A | 11/1997 | Yamazaki | |
| 5,794,129 A | 8/1998 | Komatsu | |
| 6,144,861 A | * 11/2000 | Sundelin et al. | 455/522 |
| 6,317,435 B1 | * 11/2001 | Tiedemann et al. | 370/441 |
| 6,334,058 B1 | * 12/2001 | Nystrom et al. | 455/453 |
| 6,775,541 B2 | * 8/2004 | Dillon et al. | 455/422.1 |
| 2002/0001292 A1 | * 1/2002 | Miyamoto | 370/335 |

FOREIGN PATENT DOCUMENTS

| | | |
|---|---|---|
| JP | 1051379 | 2/1989 |
| JP | 11234733 | 8/1999 |

* cited by examiner

*Primary Examiner*—Vivian Chin
*Assistant Examiner*—Minh D. Dao
(74) *Attorney, Agent, or Firm*—Dorsey & Whitney LLP

(57) ABSTRACT

A protection method for forward power saturation in a CDMA communication system and its power control apparatus are provided. The power control apparatus includes a base station (BS) transmitting power control unit, a base station (BS) transceiver and a transmitting power control (TPC) instruction counter. The mobile station includes a mobile station (MS) transceiver, a quality detector for a received signal, a TPC instruction generator. Through a saturation decision process and a saturation protection process, a limited power is distributed to a subscriber whose communication quality actually deteriorates and a subscriber whose communication quality deteriorates severely due to deep fading is rapidly compensated. Meanwhile, the protection method and control apparatus are capable of balancing the power and providing average power distribution among subscribers who need power increasing urgently.

4 Claims, 4 Drawing Sheets

PROTECTION METHOD FOR FORWARD POWER SATURATION IN CDMA COMMUNICATION SYSTEM AND ITS POWER CONTROL APPARATUS

CROSS-REFERENCE TO RELATED APPLICATION(S)

This utility patent application is a continuation application and claims the priority of the PCT application, serial number PCT/CN01/00335, filed on Mar. 19, 2001, which claims the priority of the Chinese patent application, serial number 00115073.1, filed on Mar. 23, 2000; subject matter of which is incorporated herewith by reference.

FIELD OF THE INVENTION

The present invention relates to a method for fixed step length power control in a CDMA communication system and particularly relates to a saturation protection method to control fixed step length forward power in a CDMA communication system.

BACKGROUND OF THE INVENTION

In a DS—CDMA system (Direct Sequence Code Division Multiple Access), the system carries on communication with different code or code words allocated to each subscriber when different subscribers work simultaneously on the same frequency. A communication mode makes capacity and performance of the system depend on interference on a subscriber to a great extent. In a CDMA communication system, any method of reducing interference on a subscriber will improve system performance. Power control technique is an effective means of reducing interference between channels in the system and is a key technique in a CDMA communication system.

There are two types of power control methods: continuous power control and fixed step length power control. Theoretically, the continuous power control method is superior to the fixed step length control method in performance. However, in view of complexity for realization, the later is still an effective method in implementation of power control in the system. The present invention relates to a method for fixed step length power control.

In a power control of forward links, a resource allocation to subscribers is really a distribution of total transmitting power among different subscribers by a base station. The principle on power control is to distribute minimum necessary power to each subscriber according to a transmitting power control instruction (hereinafter referred to as "TPC instruction"), i.e. each subscriber received after detection of received signal quality under the guarantee of communication quality of each subscriber.

With increasing of numbers of access subscribers in a cell, the transmitting power distributed by a base station increases too, and transmitting power finally reaches maximum at a base station. Then, the forward power control enters a saturation state where a base station has no way to get more additional transmitting power to meet the requirement of TPC instructions from the subscribers in a cell, whereby the forward power control needs a saturation protection to balance transmitting power for all subscribers under the condition that the fundamental principle on power control be satisfied.

There are two types of saturation states in forward power control:

1) Because of the influence of shadow fading and Rayleigh fading in communication channels, the balance of power control is only a dynamic balance. The subscriber's balance parameter (power or SIR) still keeps fluctuation in a stable state. When an approximately full load occurs in a cell, power requirement caused by fluctuation of balance parameter may cause the total transmitting power required by a subscriber to be beyond total transmitting power from a base station.

2) When a base station is approximately fully loaded, the receiving quality acutely deteriorates if any subscriber in a cell enters a deep fading. As a result, the subscriber requires a base station to distribute more power. Then, the base station enters a saturation state.

Two methods have been adopted under the above mentioned two conditions. The first method is to use a hand-over, i.e., a part of subscribers is handed over to adjacent cells. In fact, it is a move strategy of mobile stations. Although the method will not influence other subscribers in a system, hand-over cannot be done anywhere because of the actual location of a mobile station. For example, a subscriber in a deep-fading condition is very far from the other cells, or all adjacent cells are fully loaded and are not able to supply any channel for hand-over.

The second method is to use a saturation protection. The limited power is distributed to a subscriber who needs the most. It is guaranteed that communication quality for all subscribers are acceptable without significantly reducing the communication performance of the other subscribers. Although the saturation protection method may still cause subscribers to reduce communication quality, it is more feasible than the hand-over move strategy.

At present, there is little research done on the subject of saturation protection for forward power control. U.S. Pat. No. 5,794,129 by NEC and U.S. Pat. No. 5,689,815 by OKI have discussed a couple of methods on the subject as follows:

1) Average reduction of transmitting power of all subscribers. In this method, when a system enters a saturation state, transmitting power of all subscribers is reduced by a fixed value D1 to see whether it meets the requirement. If it is met, saturation state leaves. Otherwise, transmitting power for all subscribers is reduced again by D1 to see whether it meets the requirement. The action repeats, if necessary, till the requirement is met.

2) Reduce transmitting power of a subscriber who uses high power. In the method, it is needed to determine a transmitting power threshold. A subscriber who uses power more than the threshold is defined as high power subscriber. As saturation occurs, the transmitting power of a high power subscriber is reduced by a fixed value D2 to see whether it can meet the requirement. If it is met, saturation state leaves. Otherwise, transmitting power of a high power subscriber is reduced again by value D2. The action repeats till the requirement is met.

3) Reduce the next transmitting power in proportional to existing transmitting power. In the method, if saturation state occurs, transmitting power of all subscribers is reduced by a fixed proportional value C to see whether it can meet the requirement. If it can be met, saturation state leaves. Otherwise, transmitting power of all subscribers is reduced again by a fixed proportional value C. The action repeats till the requirement is met.

From the above, the first method is not proved well by simulation (see simulation demonstration later). In the second method, selecting a proper threshold value of a high power subscriber is very important. An improper threshold value selected may reduce system performance.

Accordingly, its realization is very difficult. The third method cannot meet the requirement of adjustment of fixed step length power.

Accordingly, there is a need for an improved protection method and a power control apparatus to meet the requirement of adjustment of fixed step length power, to balance transmitting power for all subscribers under the condition of a fundamental principle that power control be satisfied, and to make a prompt response to a subscriber who needs power increasing urgently.

SUMMARY OF THE INVENTION

To solve the above and other problems, the present invention provides a protection method for forward power saturation in a CDMA communication system to take the control of fixed step length forward power in the CDMA communication system, and wherein the method comprises the steps of:

1) determining whether the system enters a saturation state, the determining step including: when a base station receives a TPC instruction of all subscribers at each time slot, adjusting the power according to the TPC instruction to determine transmitting power to each mobile subscriber; the base station summing up the adjusted transmitting power to all mobile subscribers at each time slot to decide whether the system enters the saturation state; and if the total value of summed power is less than a predetermined threshold, further adjusting the power according to the determined power; otherwise, the system enters a saturation state, whereby a saturation protection step starts; and 2) protecting power saturation, including:

(1) a base station setting up a TPC instruction counter corresponding to each subscriber;

(2) operating a corresponding instruction counter according to the subscriber's TPC instruction, and if the TPC instruction received is a power increasing instruction, an instruction counter's value is added by 1; if the TPC instruction received is a power decreasing instruction, the instruction counter is reset;

(3) when the base station enters a saturation state, providing an order of subscribers who need power increasing in accordance with their instruction counter's values, respectively, and the subscriber showing the largest in the instruction counter is preferential to increasing transmitting power.

The present invention further provides a power control apparatus based on a saturation protection method, which includes a base station and a mobile station, wherein the base station has a base station transceiver to transmit and receive a signal, the mobile station has a mobile station transceiver to transmit and receive a signal through an antenna; wherein the base station further comprises a transmitting power control unit and a TPC instruction counter; the base station transceiver receives a signal from each mobile subscriber and sends the signal to the corresponding TPC instruction counter and to a transmitting power control unit simultaneously and at the same time, a signal output from each TPC instruction counter is also sent to the transmitting power control unit, which outputs after a decision, each corresponding adjusted power to the base station transceiver for transmitting the resulted power signal to the mobile station transceiver; wherein the mobile station further comprises a quality detector and a TPC instruction generator. The quality detector is used to detect a power signal transmitted from the mobile station, and to send the detected signal to the TPC instruction generator which sends a TPC instruction to the base station transceiver through the mobile station transceiver.

One aspect of the power control apparatus is that the transmitting power control unit at a base station comprises a power control priority ordering unit, a priority-based fixed step length power adjustment unit, a transmitting power register, a transmitting signal power summation unit, and a saturation detector, wherein the power control priority ordering unit includes a plurality of comparators, and the signals are ordered by their magnitude of values after comparison, then a result is output to the power adjustment unit, which includes a plurality of multipliers, and each multiplier sends a signal to a corresponding subscriber; the transmitting power register stores power in advance and reads out a signal according to the requirement of the priority-based fixed step length power adjustment unit; the transmitting signal power summation unit is an adder, to which all adjusted signals are output for simple summation according to the priority-based fixed step length power adjustment unit, then the signal enters into the saturation detection unit for saturation decision. The saturation detection unit is a comparator, and the compared result is output to the priority-based fixed step length power adjustment unit again for further adjustment.

In another aspect of the power control apparatus of the present invention, the TPC instruction counter is an accumulator.

As the present invention adopts the above technique and introduces a concept of priority for subscriber's power increasing, it is guaranteed that the limited power preferably is allocated to the subscriber who needs power increasing at the most to maintain communication, and not to the subscriber who needs power increasing because power control makes SIR ("signal to interference ratio") create a random fluctuation. In addition, a priority-based power control method may rapidly compensate the subscriber whose channel quality deteriorates severely due to deep fading. The method can also balance power and provide average distribution of power for subscribers to make a prompt response to subscriber who needs power increasing urgently.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE PREFERRED EMBODIMENTS

Figure 1:
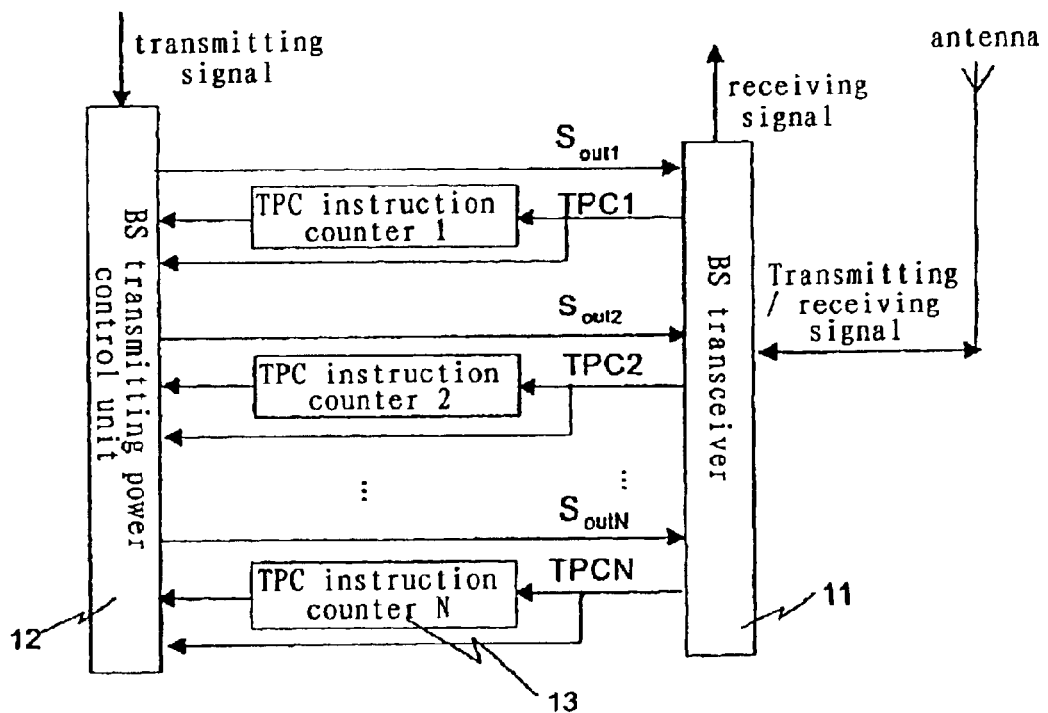
FIG. 1 is a block diagram of one embodiment of a base station of a CDMA communication system in accordance with the principles of the present invention.

Referring to the drawings, a protective method of forward power saturation in a CDMA communication system and its power control apparatus according to the present invention are applied to the control of fixed step length forward power in the CDMA communication system. The CDMA communication system includes a base station and a mobile station.

Figure 2:
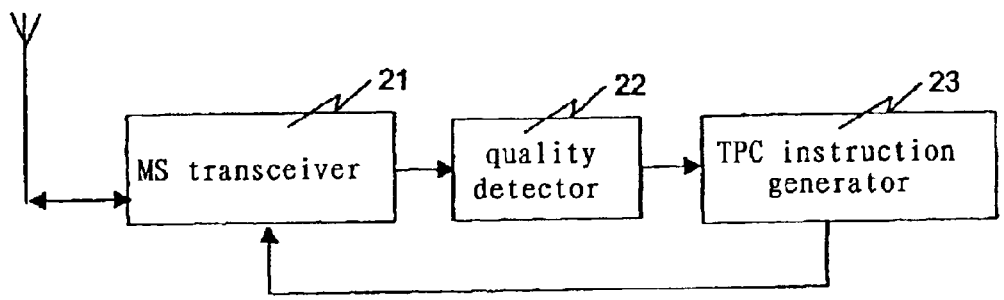
FIG. 2 is a block diagram of one embodiment of a mobile station of a CDMA communication system in accordance with the principles of the present invention.

FIG. 1 is a block diagram of one embodiment of a base station of the present invention. FIG. 2 is a block diagram of one embodiment of a mobile station of the present invention. The base station includes a base station ("BS") transceiver 11 to transmit and receive a signal. The base station also includes a transmitting power control unit 12 and a plurality of TPC instruction counters 13. The BS transceiver 11 receives a signal TPC 1 . . . , or TPC N from each mobile subscriber and sends the signal to the corresponding TPC instruction counter 13 and to each power control unit 12 simultaneously. The signal output from each TPC instruction counter 13 is also sent to the transmitting power control unit 12, which outputs each corresponding power Sout1 . . . , or SoutN to the BS transceiver 11 after decision in turn. The mobile station includes a mobile station ("MS") transceiver 21 to transmit and receive a signal through an antenna. The mobile station further includes a quality detector 22 and a TPC instruction generator 23. The quality detector 22 is a comparator that detects the power signal transmitted from the MS transceiver 21 and sends detected signal to the TPC instruction generator 23. The TPC instruction generator 23 sends the TPC instruction to the BS transceiver 11 through the MS transceiver 21.

The base station takes out TPC message from received signal and sends it to the TPC instruction counter for counting and to the transmitting power control unit at the base station for next power adjustment. Meanwhile, the transmitted signal enters the transmitting power control unit at the base station for power adjustment based on the priority control and outputs to the BS transceiver 11 for transmitting.

In FIG. 1, the antenna receives signal from each mobile station in a cell and sends it to the BS transceiver 11. The BS transceiver 11 carries on an extraction from received signal to isolate the TPC instruction from the other messages. The BS transceiver 11 sends the TPC instruction to a corresponding TPC instruction counter at the mobile station and the transmitting power control unit at the base station.

Corresponding to the TPC instruction counter at each mobile station, the base station sets up a counter for each mobile subscriber. The TPC instruction counter at the base station is responsible for recording the numbers of power increase requirement from the mobile station continuously received, that is the numbers of "1" for the TPC instruction. When the TPC instruction from a certain mobile subscriber is 1, 1 is added to the original value in the counter corresponding to that subscriber. If the TPC instruction received is "0", the counter corresponding to that subscriber is reset to 0.

The transmitting power control unit at a base station receives a TPC instruction and carries on a saturation decision. The action may proceed at any time in unit time slot. The adjusted transmitting power within a previous period of time slot length is summed, and the summed result is compared with a threshold. If the summed result exceeds the saturation threshold, the system enters a saturation mode. If the summed result doesn't exceed the saturation threshold, the system doesn't enter a saturation mode, thus avoiding synchronism problem for adjustment.

Figure 3:
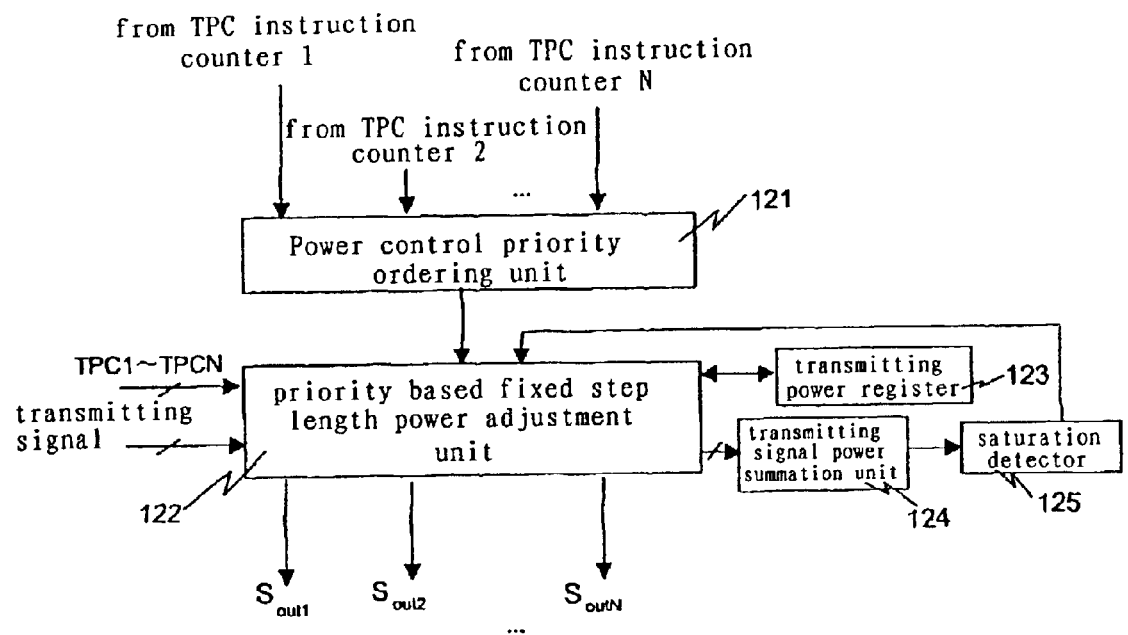
FIG. 3 is a block diagram of one embodiment of a transmitting power control unit at a base station of a CDMA communication system in accordance with the principles of the present invention.

Referring to FIG. 3, the transmitting power control unit at a base station includes a power control priority ordering unit 121, a priority-based fixed step length power adjustment unit 122, a transmitting power register 123, a transmit signal power summation unit 124, and a saturation detector 125, wherein the power control priority ordering unit 121 includes a plurality of comparators. The signals are ordered by their magnitude of values after comparison, and the result is output to the adjustment unit 122. The present invention determines the priority of different subscribers according to the history record of received TPC instruction. The subscriber's priority reflects the subscriber's existing deterioration degree of receive quality. The higher the priority represents, the more severe deterioration received signal quality. The adjustment unit 122 includes a plurality of multipliers. Each multiplier transmits a signal TPC 1 . . . , or TPC N corresponding to each subscriber. The transmitting power register 123 stores power in advance and reads out as necessary (it starts under a saturation state). The summation unit 124 is an adder, and the saturation detector 125 is a comparator. The compared result is output to the adjustment unit 122 for further power adjustment.

The power control priority sequencing unit determines the priority of power increasing of all transmit signals according to the counting result of N TPC instruction counters. The larger the counter's value, the higher the corresponding priority. The power control priority ordering unit outputs a result to the fixed step length power adjustment unit. The saturation detection unit is responsible for detecting whether the total output power at a terminal exceeds the maximum transmitting power at a base station, and the detected signal returns to the fixed step length adjustment unit. If it does so, message 1 returns. Otherwise, message 0 returns. The transmitting power register is responsible for recording the last transmitting power value, which may be used, if necessary, by the fixed step length adjustment unit. The fixed step length adjustment unit carries on adjustment according to TPC 1 . . . , or TPC N, all transmit signal values, priority of all transmit signal and saturation detection result. If message from saturation unit is 0, power adjustment is directly carried on according to the requirement from TPC 1 . . . , or TPC N, that is when TPC=1, the corresponding signal is increased according to the fixed step length. Otherwise, the corresponding signal is decreased according to the fixed step length. Signal Sout 1 . . . , or Sout N after power adjustment is directly output to the BS transceiver. If the message from the saturation detection unit is 1, the signal power of the lowest priority is decreased according to the power step length, and the priority of that signal is increased by 1 level. Simultaneously, the other signal power is directly taken from the values in transmitting power register. Then, transmitting power register is reset by the current transmitting power. On the other hand, all adjusted signals are output to transmitting power summation unit for simple summation, and the signals are output to the saturation detection unit again for saturation decision.

If it is decided that the system enters a saturation state, the adjustment is performed for the transmitting power to different subscribers according to the difference of subscriber's priority, and system will finally withdraw from saturation state. As a result, the saturation control method can assure that limited power is distributed to the subscriber whose channel quality actually deteriorates. Also, those subscribers whose channel quality deteriorates severely due to deep fading are rapidly compensated. In addition, the method can balance power and provide average distribution of power among subscribers. A prompt response is made to the subscriber who needs power increasing urgently.

Figure 4:
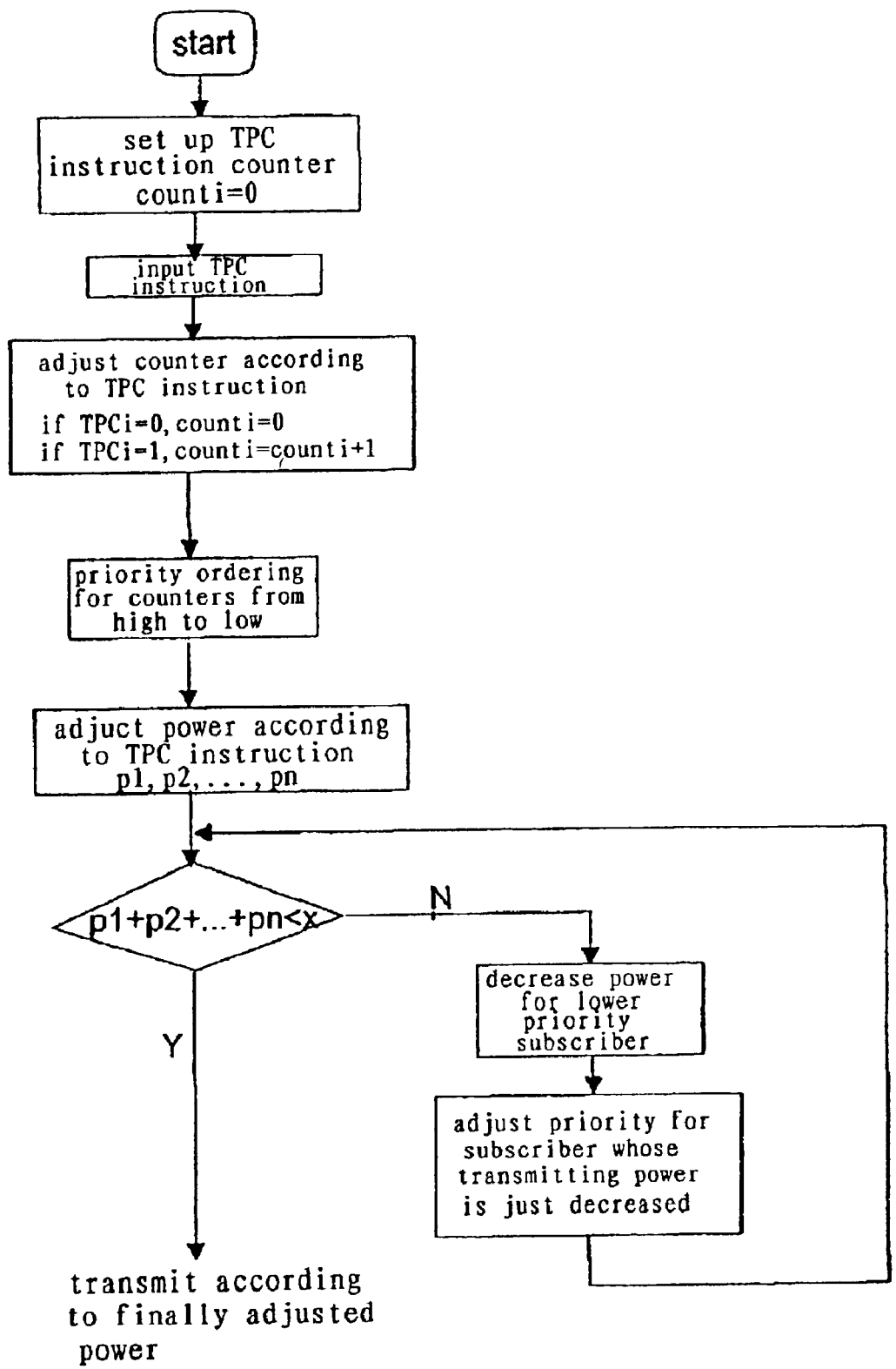
FIG. 4 is a flow chart of one embodiment of a saturation protection method in a CDMA communication system in accordance with the principles of the present invention.

FIG. 4 is a flow chart of saturation protection of the present invention. The process goes on mainly in a control unit at a base station. At first, a TPC instruction counter is set up for each mobile subscriber. When a TPC instruction is input, the control unit at the base station carries on power adjustment normally and then makes decision of a saturation mode. While the TPC instruction is input, counting value in the TPC instruction counter is updated, and determination of priority is implemented according to the magnitude of a count value. If an entering to a saturation mode is determined, the transmitting power of the lowest priority of a subscriber is decreased, then it returns to the decision mode. At the same time, the priority of the subscriber whose power is decreased can be changed (the counter's value is added by 1 to increase its priority) to avoid continuously decreasing of transmitting power of that mobile subscriber. All subscribers' priority is ordered again. Then, it decides whether the system withdraws from the saturation mode. If the system withdraws from the saturation mode, power is transmitted according to the last transmitting power. If the system does not withdraw from the saturation mode, the power allocated to the subscriber with the lowest priority is decreased again till the system withdraws from saturation mode. The delay module applies a delay of one power adjustment period.

The transmitting power control unit at a base station carries on power adjustment, saturation decision and saturation protection for the transmitting signal to each mobile station based on the received TPC instruction and the results of each TPC instruction counter according to a flow chart shown in FIG. 4. In FIG. 4, it can be seen that the transmitting power control unit at a base station performs a common control to all transceivers. It is helpful to allocate the resources of the whole system at optimum.

Power transmit control unit at a base station is responsible for saturation decision process and provides a saturation protection method as follows:

1) Saturation Decision Process

The base station receives a TPC instruction of all subscribers at each time slot, then adjusts power according to the TPC instruction to determine a transmitting power for each mobile subscriber. The base station sums adjusted transmitting power of all subscribers at each time slot to decide whether the system enters a saturation state. If total summed power is less than a predetermined threshold, adjustment carries on according to the determined power. Otherwise, the system enters a saturation state. At this time, a saturation protection process starts.

In implementation of one embodiment of the present invention, the base station receives TPC instructions, which are generally always not synchronous. The base station must adjust the transmitting power to a subscriber as soon as it receives a TPC instruction, which returns from a mobile subscriber. Here, the system decides whether a base station enters a saturation state of transmitting power at any time in unit with time slot, thus avoiding synchronism problem for adjustment.

2) Saturation Protection Method

It is a main concern that the increase power required by a subscriber will be beyond the ability to supply power by a base station when the base station is in a saturation state. Therefore, for effective power utilization, the limited power must be distributed to the subscriber who needs power increasing at the most, that is to say, the power must be preferably distributed to the subscriber whose channel quality is actually deteriorated, and not to the subscriber whose channel quality is temporarily deteriorated due to random fluctuation in a channel. Accordingly, a priority is set up to a subscriber who needs power increasing, and the subscriber's power is distributed according to the priority level. As set forth by related documents in the art, the sum of the TPC instructions received by a base station is correlative. So subscriber's priority can be set up by using previously received TPC instruction. The detailed steps of the method are as follows:

(1) A base station sets up a TPC instruction counter corresponding to each subscriber i. The counter is an accumulator in fact.

(2) If message TPC=1 (power increasing instruction) is received, instruction counter's value is added by 1.

(3) If message TPC=0 (power decreasing instruction) is received, instruction counter is reset.

(4) When a base station enters a saturation state, subscribers who need power increasing are ordered according to their instruction counter's values. The larger the value of the instruction counter, the higher the priority to get power.

As above-mentioned, the method is based on the following assumption: if subscriber continuously needs power increasing, that subscriber's instruction for power increasing is in the highest priority level at current timing. The power control method based on priority may rapidly compensate the subscriber whose channel quality severely deteriorates due to deep fading. In addition, the method can balance power and provide average distribution among subscribers. A prompt response is made to the subscriber who needs power increasing urgently.

In fact, the method of the present invention can be implemented at any time slot as follows. The TPC instruction counter at a base station records TPC characteristics from each mobile station. The transmitting power control unit at a base station carries on saturation decision according to a received TPC instruction. The adjusted transmitting power within a previous period of time slot length is summed, then the summed result is compared with a threshold. If summed result exceeds the saturation threshold, the method decides that the system enters a saturation state. If the summed result does not exceed the saturation threshold, the method decides that the system does not enter a saturation mode. Priority of different subscribers is determined by history records of the received TPC instruction. If the decision is that system enters a saturation state, then an adjustment for the transmitting power to different subscribers will be performed according to difference of subscriber's priority, and the system will finally withdraw from the saturation state.

Figure 5:
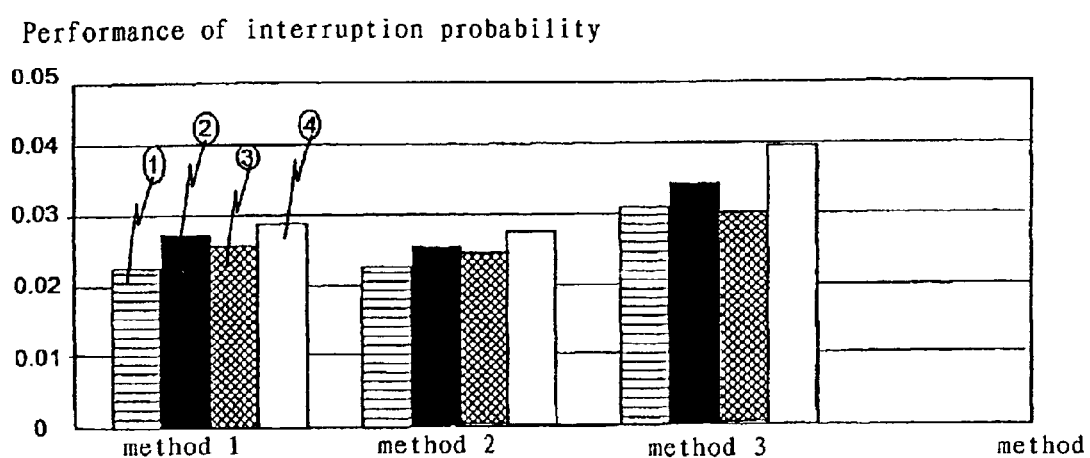
FIG. 5 is a diagram of interruption probability in comparison of performance parameter of prior art with that of simulation model of forward power control of the present invention.

FIG. 5 is a diagram of interruption probability in comparison of performance parameter of prior art with that of simulation model of the forward power control of the present invention. In FIG. 5, performance parameter of both methods is represented by interruption probability. The interruption probability is defined as probability of communication quality, which does not accord with specified condition. That is, Pout=Pr(q<h), where q is an existing parameter of communication quality, h is a quality threshold. In FIG. 5, performance curves of interruption probability of three methods under subscribers in different numbers of deep fading (20 subscribers are selected in the embodiment) are shown. Longitudinal coordinate is performance of power interruption, and lateral coordinate represents three different methods.

As shown in FIG. 5, method 1 is the method of the present invention; method 2 is the method of reducing transmitting power of high power subscriber, which is mentioned above in the application; method 3 is a method of average reduction of transmitting power of all subscribers to prior art which is mentioned above in the application. The four parts of each method in FIG. 5 show respectively: 1) Stable state; 2) Performance of saturation protection of two mobile subscribers in deep fading; 3) Performance of saturation protection of three subscribers in deep fading; 4) Performance of saturation protection of one subscriber in deep fading.

In FIG. 5, it is apparent that the method according to the present invention is superior to the method of saturation protection by reducing the next transmitting power and in proportional to existing transmitting power in prior art (method 3). The method of the present invention can obtain the result which can be obtained by a complicated method of saturation protection to reduce transmitting power of high power subscriber (method 2).

INDUSTRIAL APPLICATION

Power adjustment according to the present invention is based on a fixed step length, and, therefore, it can meet the requirement of fixed step length power adjustment. Through a saturation decision process and a saturation protection process, it is guaranteed that a limited power is allocated to those subscribers whose communication quality actually deteriorates and those subscribers whose communication quality deteriorates severely due to deep fading are rapidly compensated. Meanwhile, the method can balance power and provide average distribution among subscribers. A prompt response is made to those subscribers who need power increasing urgently.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A protection method for forward power saturation in a CDMA communication system, comprising the steps of:

determining whether the communication system enters a saturation state, which includes the steps of:

adjusting power according to a TPC instruction to determine transmitting power to each mobile subscriber when a base station receives the TPC instruction of all subscribers at each time slot;

summing up, by the base station, the adjusted transmitting power to all mobile subscribers at each time slot to decide whether the system enters the saturation state; and further adjusting the power according to the determined power if the total value of summed power is less than a predetermined threshold; otherwise the system entering a saturation state, whereby a saturation protection step starts;

protecting power saturation which includes the steps of:

setting up, by the base station, a TPC instruction counter corresponding to each subscriber; and operating a corresponding instruction counter according to the subscriber's TPC instruction, and if the TPC instruction received is a power increasing instruction, an instruction counter's value is added by 1; and if the TPC instruction received is a power decreasing instruction, the instruction counter is reset; and providing an order of subscribers who need power increasing in accordance with their instruction counter's values, respectively, when the base station enters a saturation state, wherein the subscriber showing the largest in the instruction counter is preferential to increasing transmitting power.

2. A power control apparatus for protecting power saturation in a CDMA communication system, comprising:

a base station, the base station including a base station transceiver to transmit and receive a signal;

a mobile station, the mobile station including a mobile station transceiver to transmit and receive signal through an antenna;

wherein the base station further includes a transmit power control unit and a plurality of TPC instruction counters; the base station transceiver receives a signal from each mobile subscriber and sends the signal to a corresponding TPC instruction counter and to the transmitting power control unit simultaneously, and at the same time, a signal output from each TPC instruction counter is also sent to the transmitting power control unit which outputs, after a power saturation decision is made, each corresponding adjusted power to the base station transceiver for transmitting a resulted power signal to the mobile station transceiver; and wherein the mobile station further includes a detector and a TPC instruction generator, and the detector is used to detect a power signal transmitted from the mobile station and to send the detected signal to the TPC instruction generator which sends a TPC instruction to the base station transceiver through the mobile station transceiver.

3. The power control apparatus of claim 2, wherein the transmitting power control unit at the base station comprises a power control priority ordering unit, a priority-based fixed step length power adjustment unit, a transmitting power register, a transmitting signal power summation unit, and a saturation detection unit, wherein the power control priority ordering unit includes a plurality of comparators, and the signals received at the transmitting power control unit are ordered by magnitude of values after comparison, and the ordered result is output to the adjustment unit, which includes a plurality of multipliers, wherein each multiplier sends a signal to a corresponding subscriber; the transmitting power register stores power in advance and reads out a signal according to requirement of the priority-based fixed step length power adjustment unit, wherein the transmit signal power summation unit is an adder, to which all adjusted signals are output for simple summation according to the priority-based fixed step length power adjustment unit, and the signal enters the saturation detection unit for a power saturation decision; and wherein the saturation detection unit is a comparator, the compared result is output to the priority-based fixed step length power adjustment unit again for further adjustment.

4. The power control apparatus of claim 2, wherein the TPC instruction counter is an accumulator.

* * * * *